(12) United States Patent
Chilachava et al.

(10) Patent No.: US 11,989,146 B2
(45) Date of Patent: May 21, 2024

(54) BASE MODULE OF A NETWORK ASSEMBLY AND METHOD FOR CONFIGURING AN EXTENSION MODULE OF THE NETWORK ASSEMBLY

(71) Applicant: LEDVANCE GmbH, Garching bei Munchen (DE)

(72) Inventors: David Chilachava, Munich (DE); Alexander Niggebaum, Munich (DE); Philipp Klier, Munich (DE)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 17/383,824

(22) Filed: Jul. 23, 2021

(65) Prior Publication Data
US 2022/0075748 A1 Mar. 10, 2022

(30) Foreign Application Priority Data

Sep. 7, 2020 (DE) .......................... 102020123332.9

(51) Int. Cl.
*G06F 13/40* (2006.01)
*H05B 47/18* (2020.01)
*H05B 47/19* (2020.01)

(52) U.S. Cl.
CPC ...... *G06F 13/4022* (2013.01); *G06F 13/4072* (2013.01); *H05B 47/18* (2020.01); *H05B 47/19* (2020.01)

(58) Field of Classification Search
CPC .............. G06F 13/4072; G06F 3/4022; G06F 13/4022; H05B 47/18; H05B 47/19
See application file for complete search history.

(56) References Cited

U.S. PATENT DOCUMENTS

| | | | |
|---|---|---|---|
| 8,143,811 B2* | 3/2012 | Shloush | H05B 47/175 340/5.1 |
| 2012/0212140 A1* | 8/2012 | Kim | H05B 45/30 315/291 |
| 2013/0063032 A1* | 3/2013 | Nevins | H05B 47/18 315/115 |
| 2014/0122754 A1* | 5/2014 | Gutermuth | G05B 19/0423 710/104 |
| 2015/0091383 A1* | 4/2015 | Schmucki | H01R 13/2421 307/66 |
| 2017/0231058 A1* | 8/2017 | Sadwick | H05B 45/18 |
| 2017/0231065 A1* | 8/2017 | Herter | H05B 47/18 |
| 2019/0173748 A1* | 6/2019 | Gorka | H04L 41/0806 |
| 2019/0320518 A1* | 10/2019 | Feil | G06F 8/61 |
| 2020/0183867 A1* | 6/2020 | Ender | H04L 69/08 |

\* cited by examiner

*Primary Examiner* — Phong H Dang
(74) *Attorney, Agent, or Firm* — Hayes Soloway PC (57) ABSTRACT

A base module of a network assembly comprises a logic unit configured to be connected to a communication bus for providing communication between the logic unit and one or several extension modules, in particular one or several functional devices and/or communication modules, for function extension or function provision of the network assembly. A network assembly comprising the base module and methods for configuring an extension module of the network assembly are further provided.

22 Claims, 7 Drawing Sheets

BASE MODULE OF A NETWORK ASSEMBLY AND METHOD FOR CONFIGURING AN EXTENSION MODULE OF THE NETWORK ASSEMBLY

CROSS-REFERENCE TO RELATED APPLICATION AND PRIORITY

This patent application claims priority from German Patent Application No. 102020123332.9, filed on Sep. 7, 2020, which is herein incorporated by reference in its entirety.

TECHNICAL FIELD

The present disclosure relates generally to network assemblies. More specifically, the present disclosure relates to electronic network assemblies with expandable functionality.

BACKGROUND

Electronic devices or operating devices are becoming more and more complex and have an increasing number of functionalities, which are usually realised by corresponding functional units, such as sensors, communication interfaces, intelligent electronics. Furthermore, network devices are known that can participate in device networks or IoT (Internet of Things), such as luminaires or lighting devices, in a light management system or LMS (Light Management System). In particular, the connection of a luminaire to an IoT network or LMS can be realised by means of additional, network-specific hardware and software units, which can basically be different for each network. Furthermore, network devices or luminaires are constantly being upgraded to meet modern requirements for controllability and network capability. The already existing additional units cannot easily be used for other networks or other purposes, which can lead to high costs and high environmental impact.

SUMMARY

An object of the embodiments of the present disclosure is to provide a network assembly for network devices, which can be equipped with additional functionalities in a flexible and cost-effective manner.

According to a first aspect, a base module of a network assembly is provided to solve this object, wherein the base module comprises a logic or logic unit configured to be connected to a communication bus, in particular to an internal communication bus of the network assembly, for providing communication between the logic unit and one or several extension modules or peripherals, in particular one or several functional devices and/or communication modules, for function provision or function extension of the network assembly.

In particular, the communication bus can be designed to transmit data or signals between the logic unit and the extension modules. In some embodiments, the communication bus is designed to supply one or more extension modules with electrical energy. In particular, the communication bus can comprise signal lines for serial communication or transmission of messages and/or supply lines for supplying power to the extension modules or peripherals. In some embodiments, the communication bus is formed as part of the base module. In particular, the communication bus can be designed to be connected to a plurality of functional devices and/or communication modules as extension modules in order to provide desired functionalities.

In particular, the logic unit represents the central module or node via which, in particular, all network communication can take place. The logic or the logic unit thus plays the central role in such a modular network assembly. The logic unit can forward, process and/or change information according to the intended operating scenarios. In particular, the logic unit can comprise a microcontroller with a processor for data processing, with a memory unit for storing data and machine-readable codes for the processor, and with an interface for connecting the logic unit to the communication bus. The logic unit or the microcontroller may further comprise one or more further interfaces, in particular for configuring digital inputs and outputs and/or for translating measurement signals. The configuring of the logic unit to perform certain actions means in this context that corresponding machine-readable instructions for the processor are stored in the memory unit of the logic unit to perform these actions.

The logic unit can be configured in such a way that communication via the communication bus between the logic unit and the extension modules can take place, in particular exclusively, via a system-internal or proprietary communication protocol. The system-internal communication protocol can in particular make unauthorised access to the communication bus of the network assembly more difficult or prevent it. In particular, the use of the system internal or proprietary communication protocol can make it difficult or impossible to connect unauthorised extension modules to the base module. Thus, the communication bus can serve as a protected, proprietary interface or ILB (Intra Luminaire Bus) for the exchange of data or messages between the logic unit and the extension modules or peripherals.

The functional devices or peripherals may in particular include sensors or various sensors, drivers, in particular LED drivers, push buttons and/or other devices. In the case of a luminaire, a functional device can be designed to detect or control the amount of light produced by the luminaire. In particular, a luminaire may comprise one or more light sources. In particular, a luminaire may comprise a light source for generating an indirect light, such as in a diffusely illuminating luminaire, and a light source for generating a direct light, such as in a light emitter. In this case, the control of the amount of light can be carried out directly via the logic unit or via the LMS in which the luminaire is integrated. The functional devices can also be used for data acquisition and/or transmission to the LMS. For example, the functional devices can include $CO_2$ and/or temperature sensors, which detect or monitor the current $CO_2$ concentration or temperature value, and provide the detected data, for example for the purpose of building maintenance or servicing. Furthermore, this information can be used to optimise energy consumption or to increase the efficiency of operating processes.

The one or the several communication modules may comprise a module designed for wireless communication. The extension module may in particular comprise a ZigBee, Bluetooth, DALI interface. ZigBee® is a registered trademark of the ZigBee Alliance. Bluetooth® is a registered trademark of the Bluetooth Special Interest Group. DALI® (Digital Addressable Lighting Interface) is a registered trademark of the International Standards Consortium for Lighting and Building Automation Networks. By using standardised interfaces, functional devices connected to the communication module can be remotely controlled or integrated into an LMS via standard protocols. In particular, the communication module can be designed to act as an interpreter between the logic unit and the LMS by communicating with the LMS via a standard protocol and communicating with the logic unit via the internal or proprietary protocol of the communication bus. An LMS enables customers to control different luminaires individually or in groups and to define lighting scenes ranging from simple to complex. An extension module can also be a communication module and a functional device at the same time, for example a ZigBee module with an integrated PIR sensor (Passive Infrared Sensor).

Due to the connectivity of the logic unit via the communication bus with one or more extension modules, the network assembly around the logic unit as the central unit or "core module" can be modularly and flexibly expanded or extended. Thus, an interconnect system can be realised by the base module, which allows the customer to determine the functionality, complexity and costs of operating devices or luminaires and to adapt them to his own needs. In particular, the base module represents a design platform that allows functional devices to be used freely and flexibly, if necessary in compliance with any norms, standards and requirements in the desired device network or lighting management system.

The logic unit can be configured to search for an extension module connected to the communication bus via the communication bus. This search function allows the logic unit to determine if an extension module or another extension module has been connected to the communication module and to react accordingly if necessary. The logic unit may be configured to configure an extension module for the communication bus if the search determines that the extension module is connected to the communication bus. In particular, the logic unit may automatically configure a communication module connected to the communication bus as intended, so that, for example, configuring a communication module automatically initialises the network assembly for an LMS.

In some embodiments, the logic unit has a further interface, in particular a plug & play interface, for connecting a plug & play functional unit or a functional device that can be directly controlled by the logic unit via control signals. For example, an LED driver without microcontroller-based intrinsic intelligence can be connected to the plug & play interface and directly controlled by the logic unit. In such a case, the variables of the LED driver set at the factory can be stored directly in the logic unit. Intelligent LED drivers that have their own microcontrollers can be connected to the communication bus or ILB interface.

According to a second aspect, a network assembly comprising a base module according to the first aspect is provided. The network assembly comprises at least one extension module, in particular one or more functional devices and/or communication modules, for function extension or function provision of the network assembly, and a communication bus for providing communication between the logic unit of the base module and the one or more extension modules.

The modular design of the network assembly makes it possible to easily upgrade or retrofit the network structure with extension modules.

The network assembly may comprise at least one light source, in particular at least one LED light source, and at least one driver, in particular an LED driver, for driving the at least one light source, wherein the at least one driver may be designed as a functional device connectable to the communication bus. In particular, the network assembly may be designed as a luminaire. Such a luminaire can be easily equipped with additional functions by connecting additional extension modules, such as additional functional devices and/or communication modules, to the communication bus.

In some embodiments, the network assembly includes a plug & play LED driver connected to the plug & play interface of the logic unit and directly controllable by the logic unit. Thus, simple LED drivers that are not able to communicate with the logic unit via the system's internal communication bus can be directly controlled by the plug & play interface.

The at least one extension module can comprise at least one communication module for connecting the network structure, in particular via a standardised protocol, to a network system or LMS. In particular, the at least one communication module can be designed as a communication module for wireless communication with a network system or LMS.

According to a third aspect, a method for configuring an extension module of a network assembly is provided, wherein the network assembly comprises a base module with a logic unit and a communication bus, in particular a system internal communication bus, for providing communication, in particular data communication, between the logic unit and one or more extension modules, in particular one or more functional devices and/or communication modules, for function extension or function provision of the network assembly. The method comprises a search, in particular by the logic unit, for an extension module connected to the communication bus. This search function enables the logic unit to determine whether a further extension module or modules have been connected to the communication module, in order to react accordingly if necessary. The method further comprises configuring an extension module for the communication bus if the search reveals that the extension module has been connected to the communication bus. Thus, the logic unit can automatically configure an extension module connected to the communication bus as intended, so that, for example, configuring an extension module can automatically initialise the network assembly for an LMS.

The method may comprise querying whether the extension module found during the search is a communication module, wherein the extension module may be determined to represent a functional device present in the network assembly by the communication module in a network if the query results in the extension module found during the search being a communication module. A communication module connected to the communication bus can thus be automatically configured, if necessary, for connecting the network assembly to the network, in particular LMS.

Representing may include notifying the communication module of the type of functional device present. Thus, if necessary, the information about the type of functional device can be automatically passed on to the network, in particular LMS, via the communication module.

The method can also include sending network-relevant or necessary factory settings of the functional device to the communication module. In this way, the information about the factory settings of the functional device can be automatically forwarded to the network, in particular LMS, via the communication module.

The network assembly described above makes it possible, in cases where the network structure comprises an extension module designed as a luminaire, to calibrate the luminaires subsequently, in particular after an intended installation. In particular, the calibration data can be recorded on a luminaire of the same type and transmitted to the network assembly via an extension module designed as a communication module, in particular one with online capability. In this way, such luminaires can be subsequently calibrated independently of the installation and manufacturer.

BRIEF DESCRIPTION OF THE DRAWINGS

The invention is now explained in more detail with the aid of the attached figures. The same reference signs are used in the figures for identical or similarly acting parts.

DETAILED DESCRIPTION OF THE DRAWINGS

Figure 1:
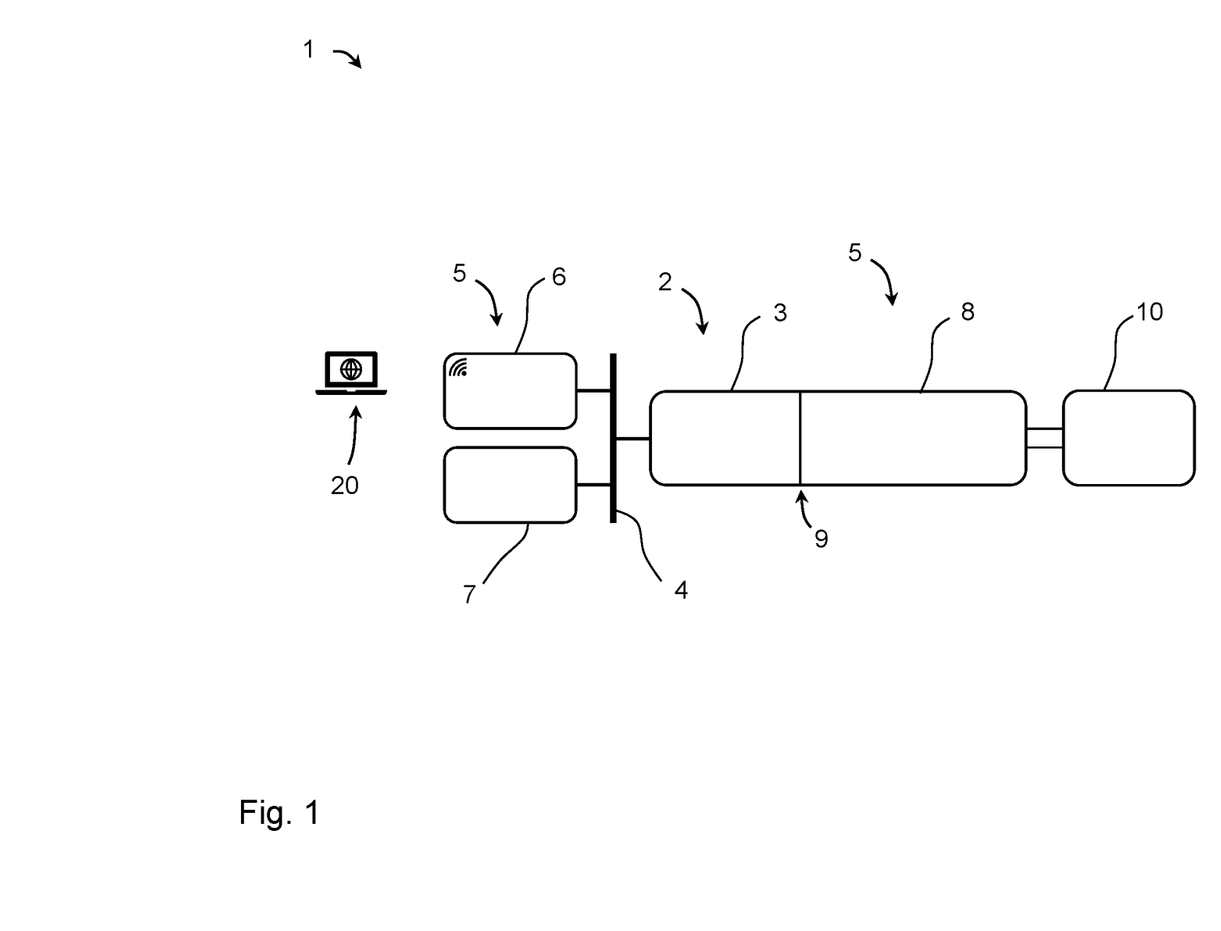
FIG. 1 schematically shows a network assembly according to an example.

FIG. 1 schematically shows a network assembly or interconnect according to an embodiment. The network assembly 1 comprises a base module 2 with a logic unit 3, a communication bus 4 and extension modules 5, which are functionally connected to the logic unit 3. In the embodiment example of FIG. 1, there are three extension modules 5 that are connected to the logic unit 3. One extension module 5 in the form of a Zigbee module 6 and one extension module 5 in the form of a sensor module 7 are connected to the logic unit 3 via the communication bus 4. An extension module 5 in the form of an LED driver 8 is connected to the logic unit 3 via an interface 9. FIG. 1 also shows a light source 10 which is electrically connected to the LED driver 8 and can be controlled by the LED driver 8. The Zigbee module 6 is designed to be connected to an LMS 20 (shown symbolically in FIG. 1).

Figure 2:
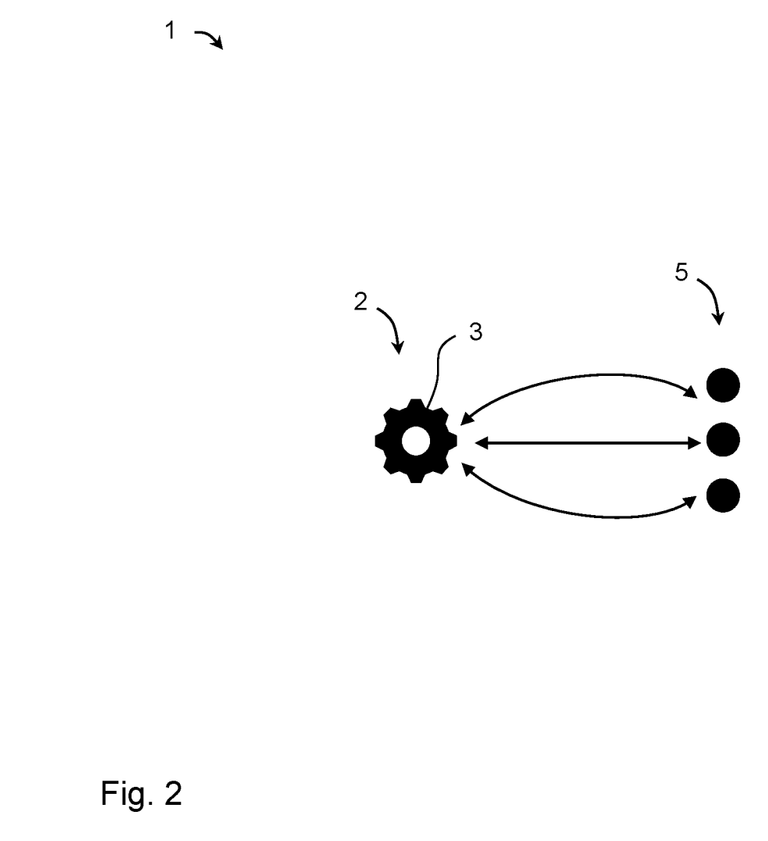
FIG. 2 schematically shows a network assembly according to a further embodiment, FIG. 3 schematically shows a network assembly according to another embodiment, FIG. 4 schematically shows a network assembly according to a further embodiment, FIG. 5 schematically shows a network assembly according to another embodiment.

FIG. 2 schematically shows a network assembly according to a further embodiment. The network assembly 1 or interconnect of FIG. 2 comprises a base module 2 with a logic unit 3 and extension modules 5, which are functionally connected to the logic unit 3. The functional connection between the logic unit 3 and the extension modules 5 is shown schematically by double-sided arrows. The extension modules 5 can be functional devices as well as communication modules. In this embodiment example, the network assembly 1 represents a standalone luminaire, wherein one of the extension modules 5 is designed as an LED driver for light control of the luminaire.

The extension modules 5 are connected to the logic unit 3 via a communication bus or ILB (not shown in FIG. 2) similar to FIG. 1. In particular, the logic unit 3 can be configured in such a way that the functional connection or communication via the communication bus between the logic unit 3 and the extension modules 5 can take place via a system-internal or proprietary communication protocol. In some embodiments, all extension modules 5 are connected to the logic unit 3 exclusively via a proprietary ILB. In some embodiments, the logic unit 3 has an additional interface, in particular a plug & play interface, to which in particular an LED driver can be directly connected. The plug & play interface can be designed as a protected proprietary interface so that the use of non-approved or non-qualified LED drivers or other extension modules can be prevented. In particular, the logic unit 3 can be configured in such a way that an LED driver that does not have microcontroller-based intrinsic intelligence can be connected directly to the plug-&-play interface. In such a case, any factory-set variables of the LED driver can be stored directly in the logic unit so that the LED driver can be controlled directly by the logic unit 3. For the LED driver or for further extension modules 5, which have their own intelligence or their own microcontroller, the connection to the logic unit 3 is possible via the communication bus 4 or ILB. The logic unit 3 can be designed to search for extension modules 5 or peripherals via the ILB and to receive, process and send messages to peripherals via the ILB in a standalone mode, in particular without integration of the network assembly 1 in an LMS.

Figure 3:
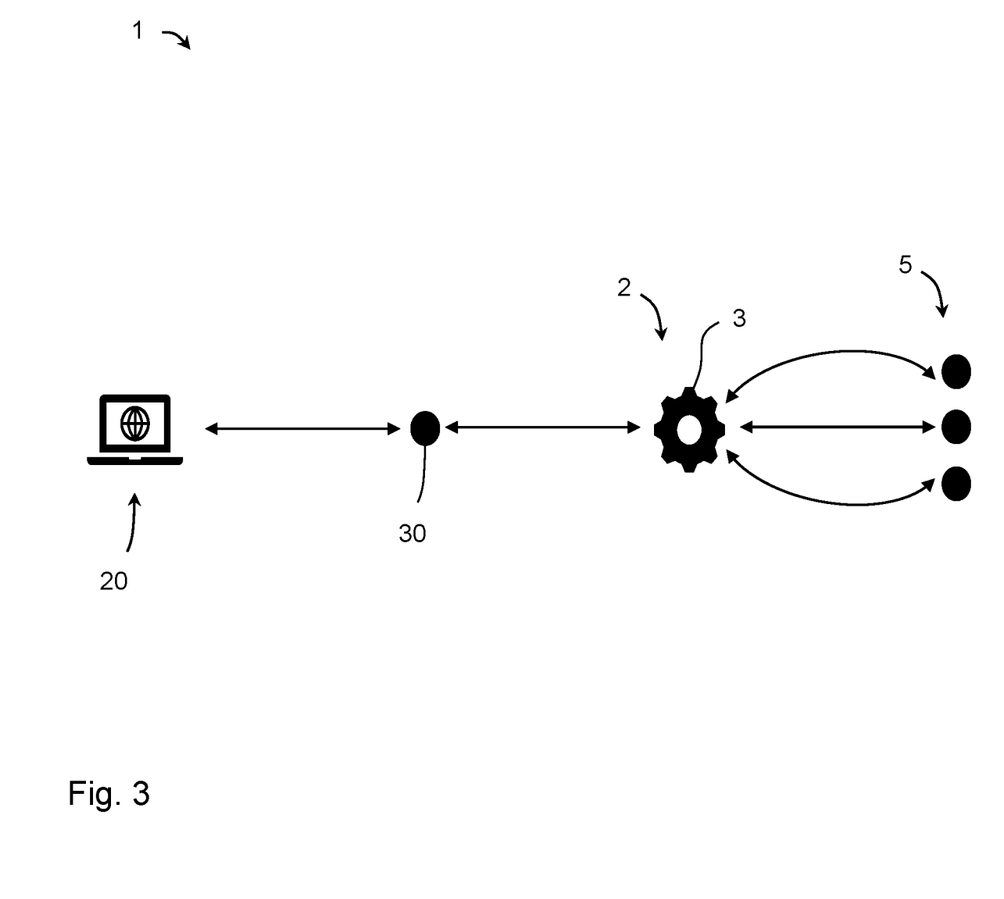

FIG. 3 schematically shows a network assembly according to another embodiment. The network assembly 1 of FIG. 3 corresponds essentially to the network structure 1 of FIG. 2 and additionally has an extension module in the form of a communication module 30, via which the network assembly 1 can be connected to an LMS 20 (shown symbolically). The further extension modules 5, which are designed as functional devices, are connected to the communication module 30 via the logic unit 3. The connection between the functional devices and the communication module 30 can be flexibly designed via the logic unit 3. In particular, the functional devices can be assigned to the communication module 30 via the logic unit 3 individually, in groups or not at all. In particular, the logic unit 3 can be configured to, after detecting a communication module 30 connected to the communication bus 4, configure it accordingly and initialise it for participation in a corresponding LMS 20. The flowchart of FIG. 6 below shows the corresponding process flow.

Figure 4:
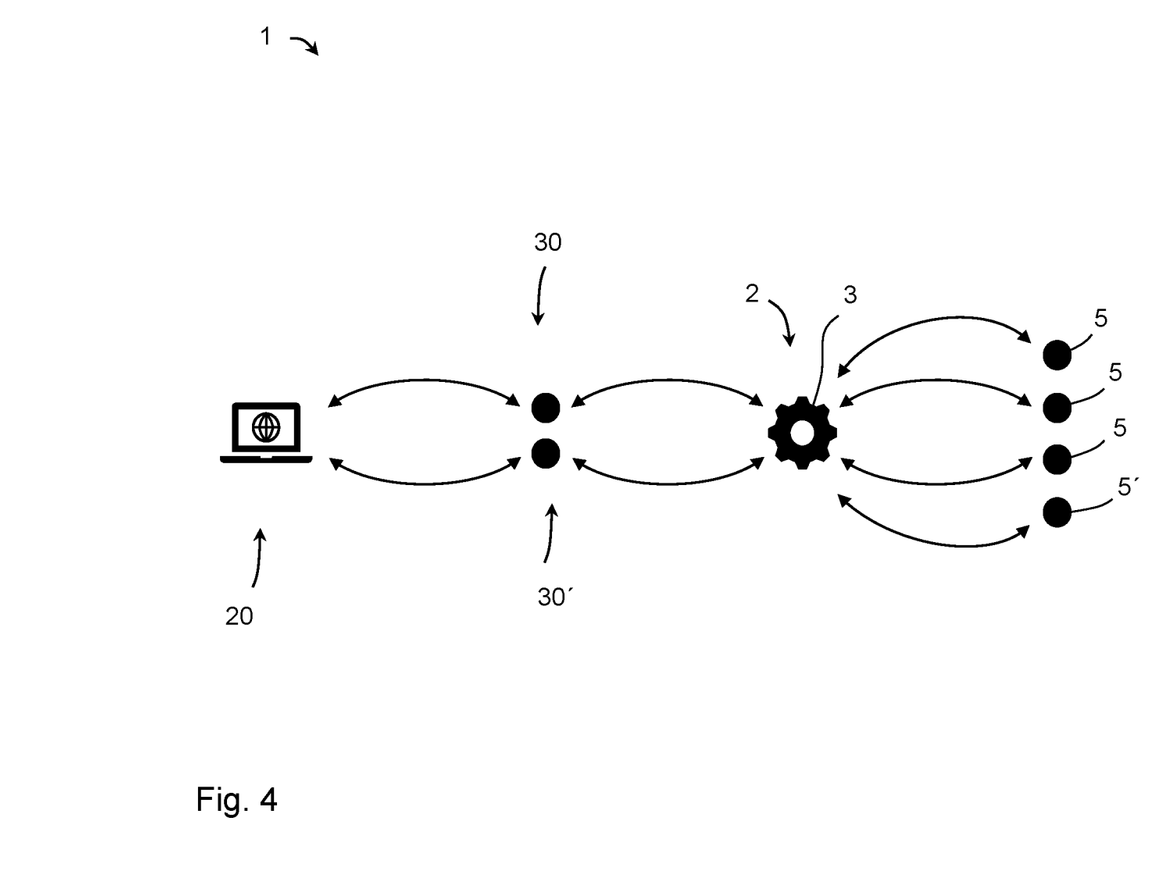

FIG. 4 schematically shows a network assembly according to a further embodiment. The network assembly 1 of FIG. 4 corresponds essentially to the network assembly 1 of FIG. 3 and additionally has a further communication module 30'. Thus, in addition to a first communication module 30, the network assembly 1 of FIG. 4 has a second communication module 30', wherein the network assembly 1 can be connected to an LMS 20 (shown symbolically) via the first communication module 30 and the second communication module 30'. The embodiment example shown in FIG. 4 corresponds in particular to the case when the number of functional devices reaches the limit of a communication module for proper operation in an LMS, after which another communication module of the same type is attached to the logic. The logic unit 3 may in particular be configured to be connected to a plurality of communication modules 30, 30' via the communication bus 4 or ILB so as to ensure proper operation of several functional devices in an LMS. In particular, the logic unit 3 may be configured to assign functional devices to the individual communication modules 30, 30' so that the network assembly 1 can be easily scaled by accommodating additional functional devices. For example, some extension modules 5 or functional devices can be assigned to the first communication module 30 and other extension modules 5' or functional devices can be assigned to the second communication module 30'.

Figure 5:
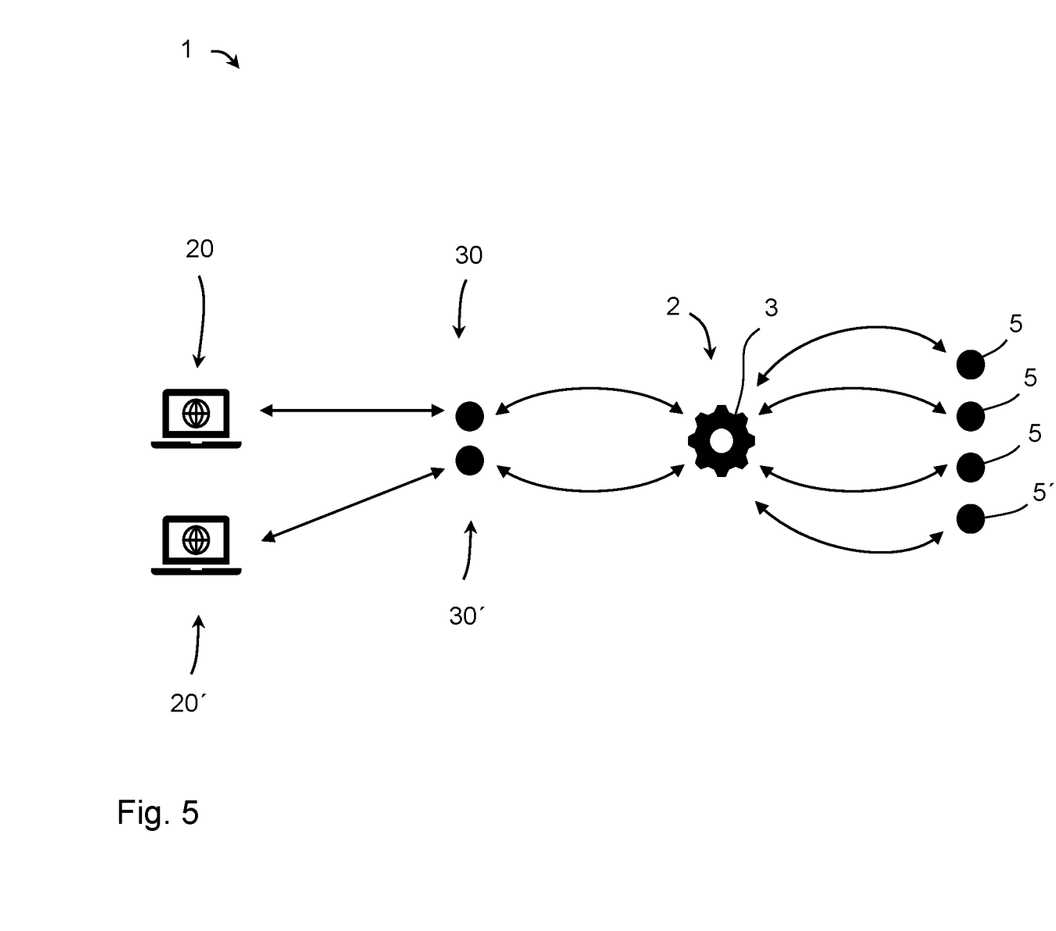

FIG. 5 schematically shows a network assembly according to another embodiment. The network assembly 1 of FIG. 5 corresponds essentially to the network assembly 1 of FIG. 4. Here, FIG. 5 refers to an application when the customer is given the option of displaying the extension modules 5, 5' or functional devices connected to the logic unit 3 alternatively or simultaneously in two LMS 20, 20'. For this purpose, according to the embodiment example shown, two different communication modules 30, 30' are used, which can be configured by the logic unit 3. In this case, the logic unit 3 changes to a multi-master mode operation due to the simultaneous existence of two different LMS 20, 20'.

The network assemblies described in FIGS. 1, 3, 4 and 5 above can be designed to subsequently calibrate a luminaire for more precise colour control and optimised maintenance. For example, the measurements can be performed on luminaires with the same luminaire type provided and the calibration data can be made available to the existing installation as an online update. For this option, an extension module or peripheral is installed or used in the installation, which has an "online update" capability (e.g. ZigBee peripheral). This calibration data may include, in particular, information on the warmest and coldest colour temperature, the nominal luminous flux and power of the luminaire, and/or a Colour Rendering Index (CRI), as well as information on manufacturers, etc. An implementation example of such a subsequent calibration is shown as a flow chart in FIG. 7.

Figure 6:
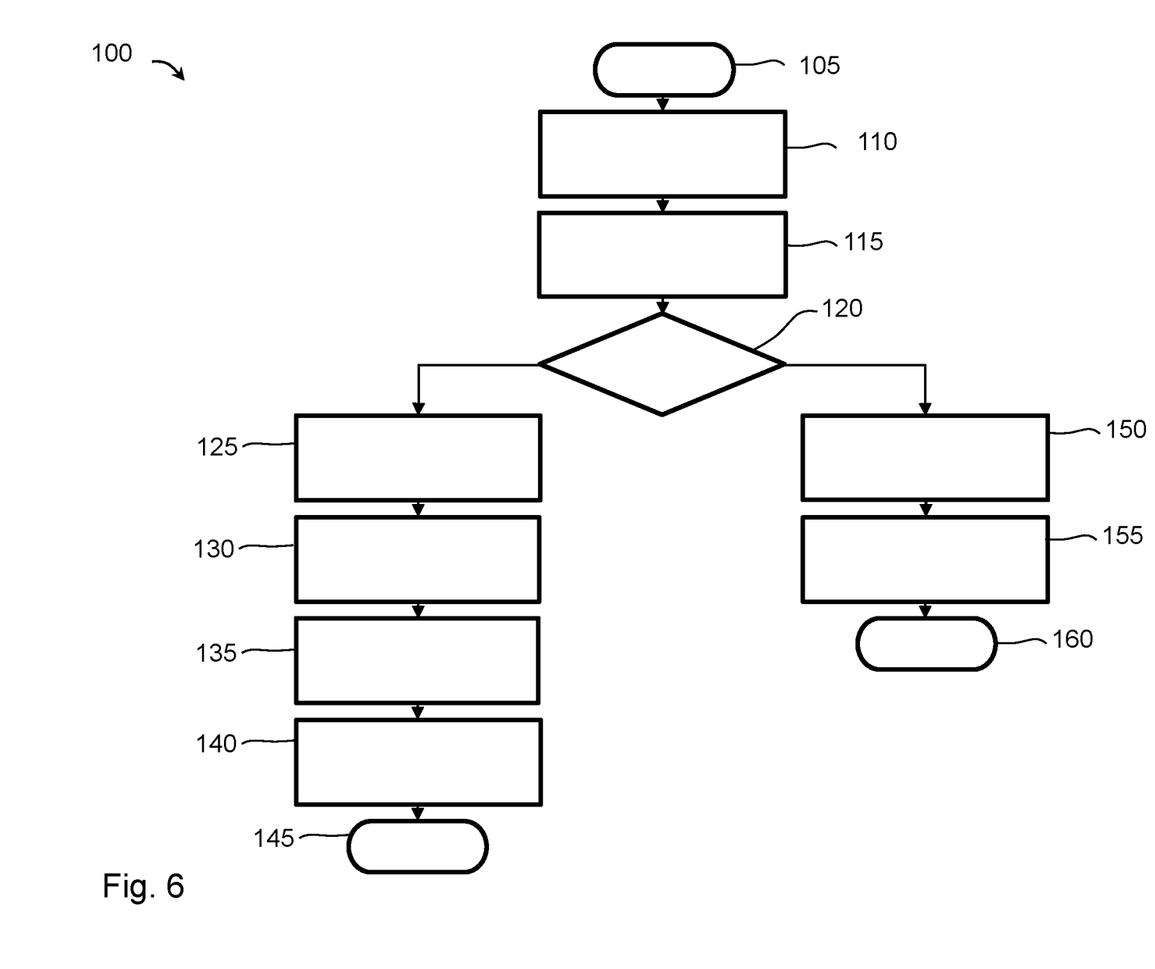
FIG. 6 shows a flowchart of a method for configuring an extension module according to an embodiment.

FIG. 6 shows a flowchart of a method for configuring an extension module according to an embodiment. The method 100 for configuring an extension module or peripheral shown in FIG. 6 can be executed in particular in one of the network assemblies shown in FIGS. 1, 3, 4, and 5. According to the embodiment example of the method 100 shown in FIG. 6, after a start 105 of the method 100, in the method step 110 a search is made for a peripheral or an extension module 5 connected to the base module 2, in particular via the communication bus 4 or ILB. In the subsequent step 115, the peripheral or extension module 5 found is configured for the communication bus or ILB. By configuring the extension module in the method step 115, the extension module 5 or peripheral is enabled to participate in the communication via the communication bus 4. In a query step 120, it is queried whether the extension module or peripheral found is a communication module.

If the query in step 120 shows that the extension module 5 found is a communication module, then in method step 125 the communication module can be designated to represent a functional device already present in the network assembly 1 in an LMS. In method step 130, the peripheral or communication module 30 is then notified of the type of functional device to be represented. In the method step 135, the factory settings of the functional device necessary for participation in the LMS are then sent to the communication module 30. In the method step 140, the peripheral or the communication module found is activated for participation in the LMS. The method 100 for configuring the extension module is then terminated with the method step 145.

If the interrogation step 120 shows that the extension module is not a communication module, the extension module is recognised as a functional device in the method step 150. In the following method step 155, the functional device is initialised and the method is ended with method step 145.

Figure 7:
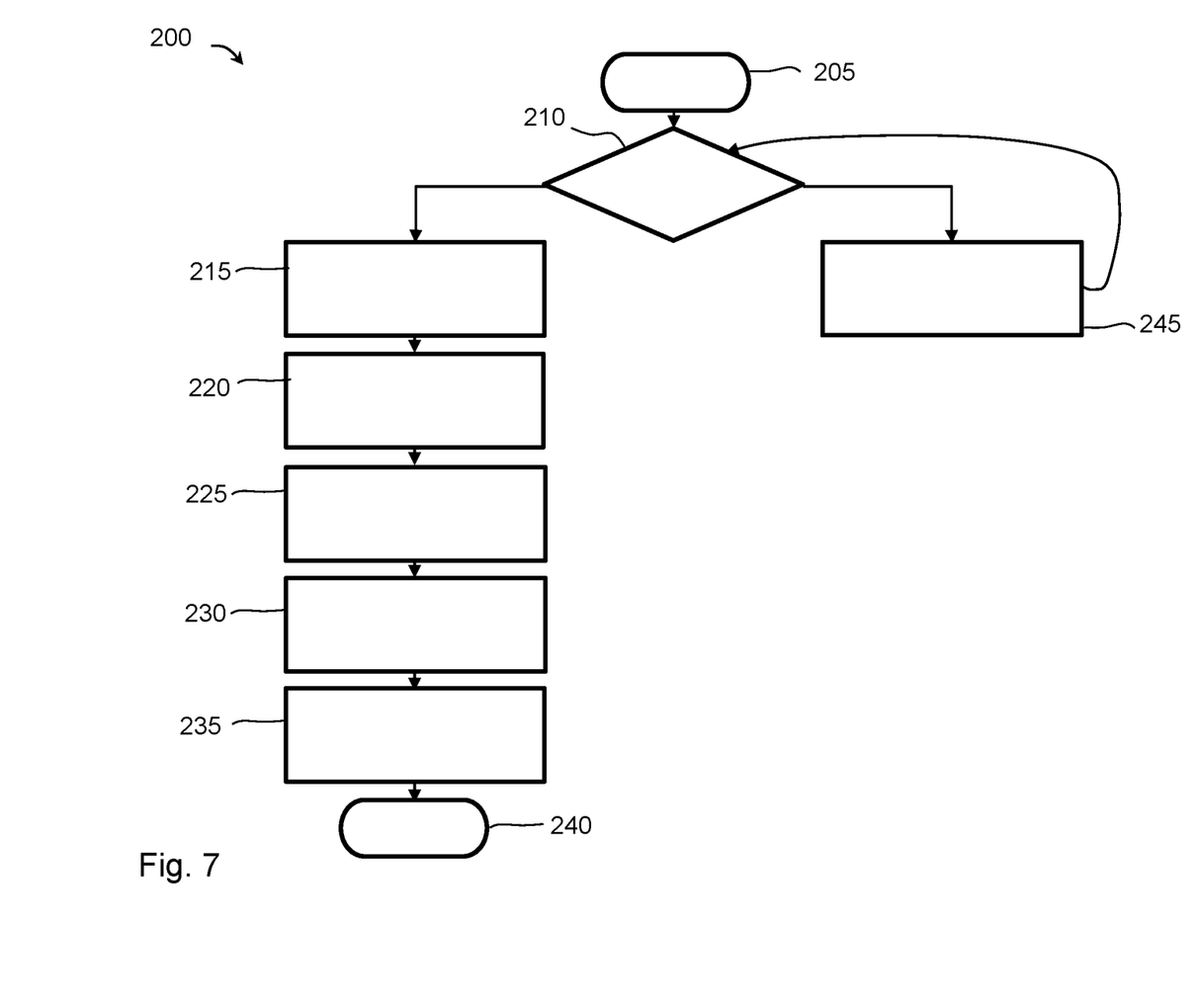
FIG. 7 shows a flow chart of a method for calibrating a luminaire.

FIG. 7 shows a flowchart of a method for calibrating a luminaire. In particular, the method 200 shown in FIG. 7 can be performed to calibrate a luminaire having an internal architecture according to one of the network assemblies shown in FIGS. 1 to 5. According to the embodiment example of the method 200 shown in FIG. 7, after a start 205 of the method 200, a query 210 is performed by the logic unit 3 as to whether a luminaire is present or connected to the ILB. If the query 210 shows that a luminaire is present, a luminaire, in particular of the same luminaire type, is measured for calibration in the method step 215. In method step 220, calibration data is acquired and in method step 225, the acquired calibration data is transmitted to an online-capable peripheral or communication module of the network assembly. In the following step 230, the logic unit 3 is informed of the data received and the control, in particular the colour control of the luminaire, is adjusted accordingly. In the method step 235, the luminaire data is made available to the LMS and the method is ended with the method step 240. If the query in step 120 shows that no luminaire, in particular no luminaire with the required luminaire type, is available, a luminaire is requested to be measured in the method step 245.

This calibration option allows customers to minimise the logistical effort associated with commissioning an LMS. This is because usually the luminaires with an LED driver are individually calibrated in the factory. With the luminaires described here, the luminaires can be purchased flexibly, especially from desired manufacturers, and only calibrated subsequently, in particular according to the calibration procedure described above.

In addition to the possibility of subsequent factory-independent calibration, the platform design-based network assemblies described above offer a number of advantages. Such network assemblies or systems can, for example, be easily scaled up by connecting further extension modules, in particular functional devices and/or communication modules, to the communication bus or ILB. Furthermore, functional devices can be used flexibly, as required, in different networks or LMSs or in a standalone device or luminaire. Furthermore, due to the flexibility of the communication modules, different functional devices can be integrated into an LMS both individually and simultaneously. The modularity of the network structure simplifies the change from one, for example outdated, LMS to another, in particular future-proof, LMS without having to discard the already existing functional devices. In addition to direct economic advantages, this can be of decisive importance for both luminaire manufacturers and customers, especially with regard to the "circular economy" and ever stricter environmental regulations. The ability to subsequently calibrate the luminaires makes it possible to achieve precise light colour control and high-quality Human Centric Lighting (HCL), for example by imitating daylight particularly realistically.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be connected with each other in order to obtain further functions.

LIST OF REFERENCE SIGNS 1 network assembly
2 basic module
3 logic unit 4 communication bus
5, 5' extension module
6 Zigbee module
7 sensor module
8 LED driver
8 interface
9 light source
20, 20' LMS
30, 30' communication module
100 method for configuring an extension module
105 method step
110 method step
115 method step
120 method step
125 method step
130 method step
135 method step
140 method step
145 method step
150 method step
155 method step
160 method step
200 method for calibrating a luminaire
205 method step
210 method step
215 method step
220 method step
225 method step
230 method step
235 method step
240 method step
245 method step

The invention claimed is:

1. A base module of a network assembly, the base module comprising:
   a logic unit comprising a processor and memory communicatively coupled with the processor; and
   a communication bus formed as part of the base module and configured for providing communication between the logic unit and one or several extension modules connectable to the communication bus for function extension or function provision of the network assembly such that the network assembly is modularly expandable around the logic unit, wherein the communication bus comprises:
      a signal line configured for communication between the one or several extension modules and the logic unit; and
      a supply line configured for supplying power to the one or several extension modules from the logic unit;
   wherein the logic unit is configured to be directly connected, via an interface separate from the communication bus, to a driver configured for driving at least one light-generating element of a luminaire, wherein the driver is external to the base module, and wherein the logic unit is configured to directly control the driver via the interface based at least in part on input received through the communication bus from the one or several extension modules.

2. The base module according to claim 1, wherein the logic unit is configured such that communication via the communication bus between the logic unit and the one or several extension modules is able to take place via an in-system communication protocol.

3. The base module according to claim 1, wherein the logic unit is configured to search for an extension module connected to the communication bus via the communication bus.

4. The base module according to claim 3, wherein the logic unit is further configured to configure an extension module for the communication bus when the search reveals that the extension module is connected to the communication bus.

5. The base module according to claim 1, wherein the interface is configured as a plug & play interface.

6. A network assembly comprising:
   the base module according to claim 1;
   at least one extension module, wherein the at least one extension module comprises at least one of:
      a communication module for connecting the network assembly to a network system; and
      a communication module for wireless communication with the network system; and
   the communication bus.

7. A method for configuring an extension module of a network assembly, wherein:
   the network assembly comprises a base module comprising:
      a logic unit comprising a processor and memory communicatively coupled with the processor; and
      a communication bus formed as part of the base module and configured for providing communication between the logic unit and one or several extension modules connectable to the communication bus for function extension or function provision of the network assembly such that the network assembly is modularly expandable around the logic unit, wherein the communication bus comprises:
         a signal line configured for communication between the one or several extension modules and the logic unit; and
         a supply line configured for supplying power to the one or several extension modules from the logic unit;
      wherein the logic unit is configured to be directly connected, via an interface separate from the communication bus, to a driver configured for driving at least one light-generating element of a luminaire, wherein the driver is external to the base module, and wherein the logic unit is configured to directly control the driver via the interface based at least in part on input received through the communication bus from the one or several extension modules; and
   the method comprises:
      searching for an extension module connected to the communication bus; and
      configuring an extension module for the communication bus if the search shows that the extension module is connected to the communication bus.

8. The method according to claim 7, further comprising:
   querying whether the extension module found during the search is a communication module; and
   designating the extension module to represent a functional device present in the network assembly by the communication module in a network if the query results in the extension module found in the search being a communication module.

9. The method according to claim 8, wherein designating the extension module to represent the functional device comprises:

notifying the communication module of the type of functional device being represented.

10. The method according to claim 9, wherein designating the extension module to represent the functional device further comprises:
sending factory settings of the functional device to be represented to the communication module.

11. The method according to claim 7, wherein the method further comprises:
installing the luminaire; and
subsequently calibrating the luminaire.

12. The method according to claim 11, wherein subsequently calibrating the luminaire comprises:
transmitting calibration data for calibrating the luminaire to the network assembly via an extension module configured as a communication module.

13. The method according to claim 12, wherein the calibration data comprises data pertaining to at least one of: color temperature; luminous flux; power of the luminaire; and color rendering index (CRI).

14. The method according to claim 7, wherein the function extension or function provision of the network assembly is in order to provide at least one additional function of the luminaire, wherein the at least one additional function comprises at least one of:
control of the luminaire and/or a network function of the luminaire; and
calibration of the luminaire utilizing calibration data detected by the one or several extension modules.

15. The base module according to claim 1, wherein the function extension or function provision of the network assembly is in order to provide at least one additional function of the luminaire, wherein the at least one additional function comprises at least one of:
control of the luminaire and/or a network function of the luminaire; and
calibration of the luminaire utilizing calibration data detected by the one or several extension modules.

16. A lighting system comprising:
the base module according to claim 1; and
the luminaire.

17. The base module according to claim 1, wherein the logic unit comprises a microcontroller, the microcontroller comprising the processor and the memory communicatively coupled with the processor.

18. The base module according to claim 1, wherein the logic unit further comprises a second interface configured for connecting the logic unit to the communication bus.

19. The base module according to claim 18, wherein the logic unit further comprises a third interface configured for at least one of:
configuring digital inputs and/or outputs; and
transmitting measurement signals.

20. The base module according to claim 1, wherein the logic unit is configured to serve as a central node of the network assembly via which all network communication takes place.

21. The base module according to claim 1, wherein the logic unit is configured to determine whether a given extension module is either a functional device or a communication module and to notify a light management system external to the base module of said determination.

22. The base module according to claim 1, wherein the signal line is configured for two-way communication between the one or several extension modules and the logic unit.

* * * * *